(12) United States Patent
Kurose et al.

(10) Patent No.: US 8,767,603 B2
(45) Date of Patent: Jul. 1, 2014

(54) MOBILE WIRELESS TERMINAL AND BASE STATION SEARCH METHOD

(75) Inventors: Kengo Kurose, Hamura (JP); Takashi Minemura, Ome (JP); Tsuyoshi Kogawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 313 days.

(21) Appl. No.: 13/179,444

(22) Filed: Jul. 8, 2011

(65) Prior Publication Data

US 2011/0268005 A1 Nov. 3, 2011

Related U.S. Application Data

(63) Continuation of application No. PCT/JP2010/062635, filed on Jul. 27, 2010.

(30) Foreign Application Priority Data

Mar. 31, 2010 (JP) ................................. 2010-082870
Jul. 2, 2010 (JP) ................................. 2010-152301

(51) Int. Cl.
*H04W 52/02* (2009.01)

(52) U.S. Cl.
USPC ........... 370/311; 370/328; 370/329; 370/330; 370/327; 370/312; 455/210; 455/211; 455/256; 455/273

(58) Field of Classification Search
USPC ......... 370/311, 328, 327, 326, 312, 329, 330; 455/517, 219, 225, 551, 560
See application file for complete search history.

(56) References Cited

U.S. PATENT DOCUMENTS

2005/0255847 A1* 11/2005 Han et al. ...................... 455/436
2007/0217356 A1* 9/2007 Kanno et al. .................. 370/328
2009/0323659 A1* 12/2009 Zhang ............................ 370/338

FOREIGN PATENT DOCUMENTS

| JP | 2005-012973 A | 1/2005 |
| JP | 2005-047494 A | 2/2005 |
| JP | 2007-104033 A | 4/2007 |

OTHER PUBLICATIONS

International Search Report mailed by Japan Patent Office on Feb. 11, 2010 in the corresponding PCT/JP2010/062635 filed on Jul. 27, 2010.
International Preliminary Report on Patentability issued Oct. 30, 2012, in PCT Application No. PCT/JP2010/062635 filed Jul. 27, 2010, in eight (8) pages.
* cited by examiner

*Primary Examiner* — Brandon Renner
*Assistant Examiner* — Abdelnabi Musa
(74) *Attorney, Agent, or Firm* — Knobbe, Martens, Olson & Bear, LLP

(57) ABSTRACT

According to one embodiment, a mobile wireless terminal, which makes a wireless communication with a base station accommodated in a network, includes a receiver, a communication module, and a controller. The receiver is configured to receive and frequency-convert a wireless signal transmitted from the base station, and to detect a beacon signal transmitted from the base station based on a reception signal obtained by the frequency conversion. The communication module is configured to receive a wireless signal transmitted from the base station, to acquire identification information of the base station by decoding a reception signal obtained from the wireless signal, and to communicate with the base station. The controller is configured to activate the communication module in accordance with a reception result of the beacon signal by the receiver, and to control the communication module to acquire identification information from the base station.

18 Claims, 12 Drawing Sheets

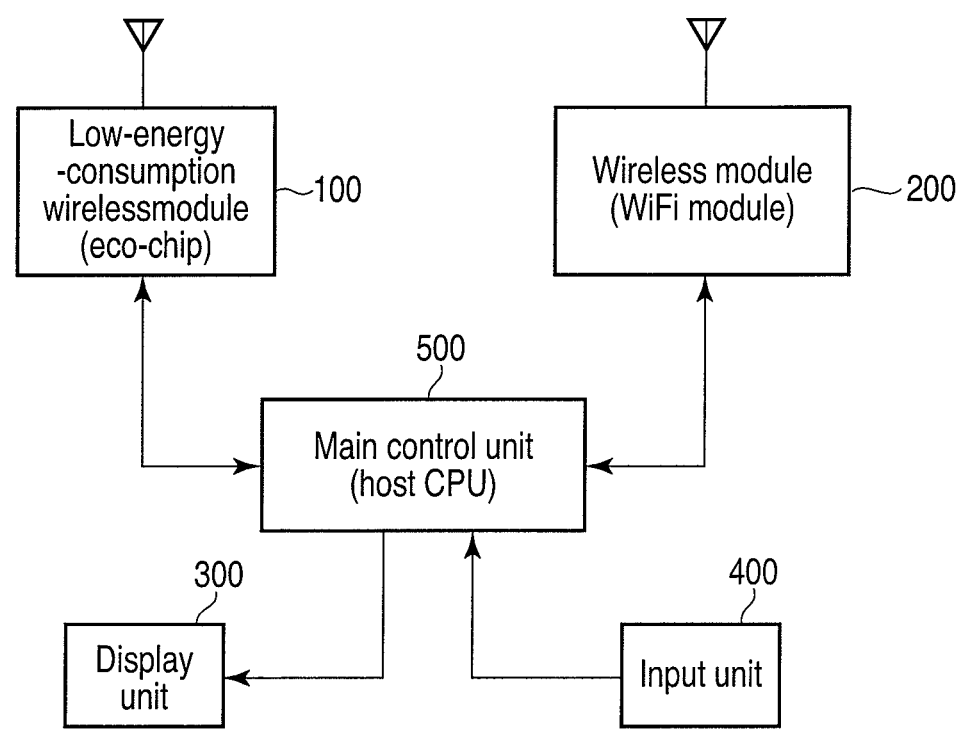
F I G. 1

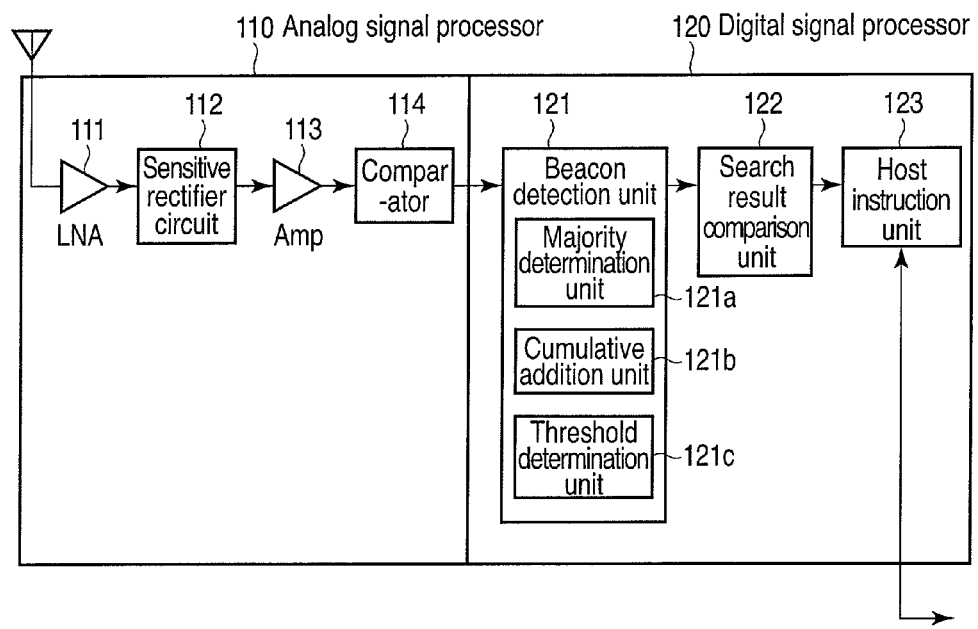
F I G. 2
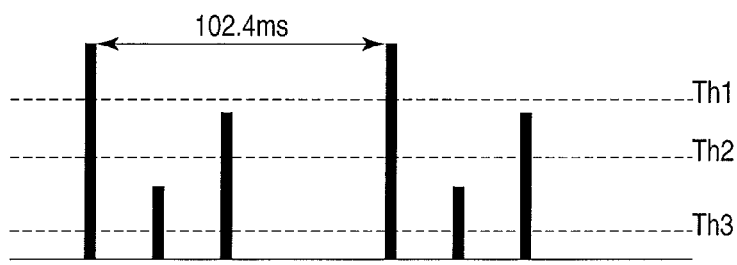
F I G. 3

| Number k of samples | Required number of memories | Storage period [us] | Error with respect to 102.4 ms | Number of samples to be discarded per search window | Error caused by 10 cumulative additions |
|---|---|---|---|---|---|
| 3 | 1118 | 91.55 | 44.04 | 1 | 135.22 |
| 5 | 671 | 152.59 | 13.53 | 0 | 135.3 |
| 7 | 479 | 213.62 | 74.56 | 2 | 135.25 |
| 9 | 372 | 274.66 | 227.15 | 7 | 135.27 |
| 11 | 305 | 335.69 | 13.53 | 0 | 135.3 |
| 13 | 258 | 696.73 | 44.04 | 1 | 135.22 |

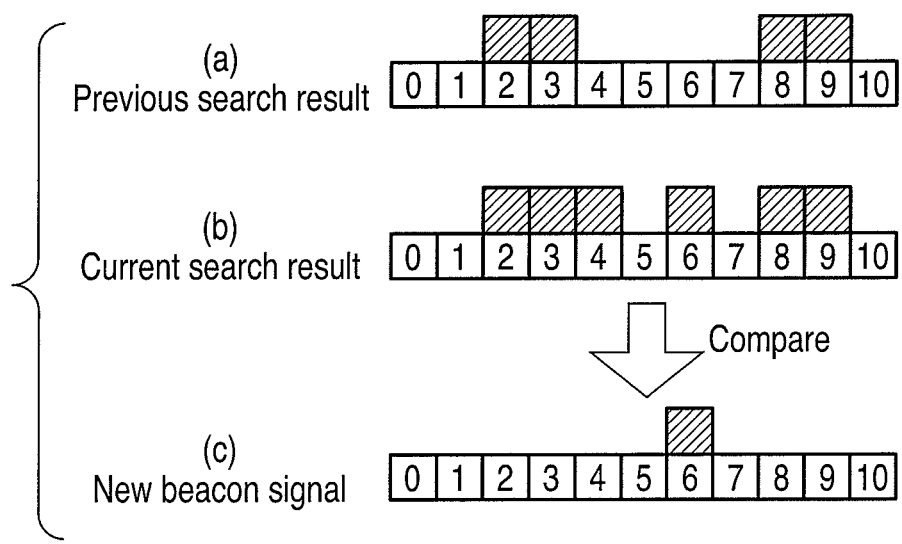
F I G. 15

MOBILE WIRELESS TERMINAL AND BASE STATION SEARCH METHOD

CROSS REFERENCE TO RELATED APPLICATIONS

This is a Continuation Application of PCT Application PCT/JP2010/062635, filed Jul. 27, 2010, and published under PCT Article 21(2) in Japanese, which is based on and claims the benefit of priority to Japanese Patent Applications No. 2010-082870, filed Mar. 31, 2010, and No. 2010-152301, filed Jul. 2, 2010, the entire contents of all of which are hereby incorporated herein by reference.

FIELD

Embodiments described herein relate generally to a mobile wireless terminal which makes a wireless communication with a base station accommodated in a network.

BACKGROUND

As is well known, low energy consumption is important for a mobile wireless terminal, and even processing for searching for base stations accommodated in a network adopts a technique for achieving low energy consumption. For example, when a mobile wireless terminal is located outside a service area of a base station, if it cannot detect any base station for a long period of time, it sets a long search period to decrease a search frequency, thereby reducing energy consumption.

However, with such conventional method, when the search period is prolonged, detection of movement into the service area is delayed, thus impairing user's convenience.

The conventional mobile wireless terminal suffers the following matter. That is, when the base station search period is prolonged to reduce energy consumption, detection of movement into the service area is delayed, thus impairing user's convenience.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a circuit block diagram showing the arrangement of an embodiment of a mobile wireless terminal;

FIG. 2 is a circuit block diagram showing an example of the arrangement of a low-energy-consumption wireless module of the mobile wireless terminal shown in FIG. 1;

FIG. 3 is a view for explaining the operation of a comparator of the low-energy-consumption wireless module shown in FIG. 2;

FIG. 15 is a view for explaining determination of a new beacon signal by the search result comparison unit shown in FIG. 2.

DETAILED DESCRIPTION

Figure 4:
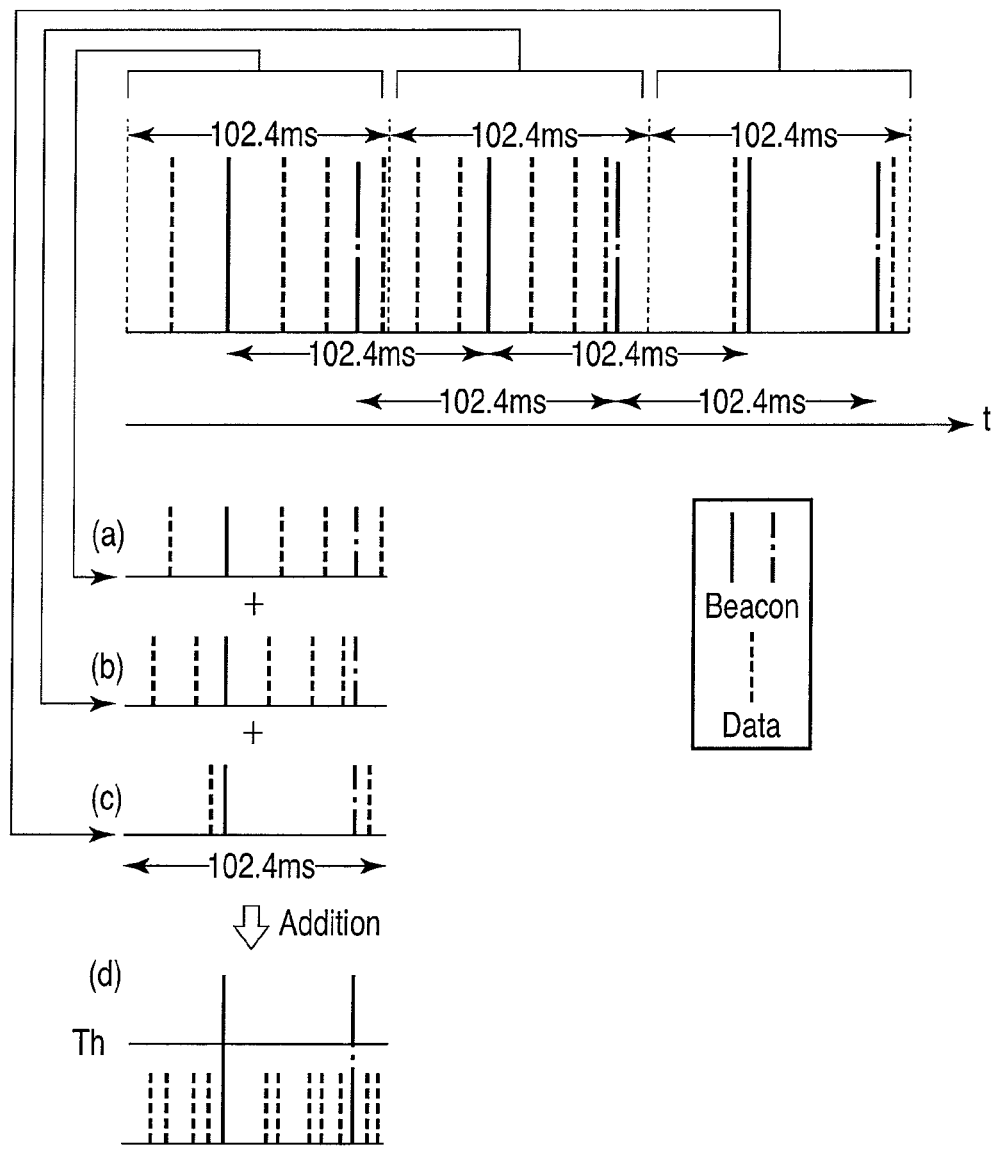
FIG. 4 is a view for explaining detection processing of beacon signals by the low-energy-consumption wireless module shown in FIG. 2.

Various embodiments will be described hereinafter with reference to the accompanying drawings.

In general, according to one embodiment, a mobile wireless terminal, which makes a wireless communication with a base station accommodated in a network, includes a receiver, a communication module, and a controller. The receiver is configured to receive and frequency-convert a wireless signal transmitted from the base station, and to detect a beacon signal transmitted from the base station based on a reception signal obtained by the frequency conversion. The communication module is configured to receive a wireless signal transmitted from the base station, to acquire identification information of the base station by decoding a reception signal obtained from the wireless signal, and to communicate with the base station. The controller is configured to activate the communication module in accordance with a reception result of the beacon signal by the receiver, and to control the communication module to acquire identification information from the base station.

FIG. 1 shows the arrangement of a mobile wireless terminal according to an embodiment. This mobile wireless terminal has a function of making a wireless communication with a base station (wireless LAN access point) accommodated in a network, and includes, as the arrangement associated with this wireless communication, a low-energy-consumption wireless module 100, wireless module 200, display unit 300, input unit 400, and main control unit 500 (host CPU). Note that a case will be exemplified below wherein a wireless LAN is adopted as the wireless communication method.

The low-energy-consumption wireless module (eco-chip) 100 searches for a base station by receiving beacon signals transmitted from the base station periodically (102.4 ms will be exemplified below), and manages the base station based on a reception profile of the beacon signals. That is, the low-energy-consumption wireless module 100 has a function of receiving wireless LAN signals, monitoring reception power levels and reception timings of beacon signals of the received signals, and consequently notifying the main control unit 500 of movement into a service area of a new base station.

The low-energy-consumption wireless module 100 is autonomously operative even when the main control unit 500 is inactive (halt or sleep), and has a function of activating the inactive main control unit 500.

FIG. 2 shows an example of the arrangement of the low-energy-consumption wireless module 100. The low-energy-consumption wireless module 100 includes an analog signal processor 110 and digital signal processor 120. The analog signal processor 110 includes a low-noise amplifier (LNA) 111, sensitive rectifier circuit 112, baseband signal amplifier 113, and comparator 114. The digital signal processor 120 includes a beacon detection unit 121, search result comparison unit 122, and host instruction unit 123.

The low-noise amplifier (LNA) 111 amplifies a wireless LAN signal received from a base station, and outputs it to the sensitive rectifier circuit 112. Note that as a maximum reception sensitivity of a wireless LAN signal transmitted from a base station, a sensitivity equivalent to the wireless module 200 is assumed, and a gain of the low-noise amplifier 111 is set to adjust this wireless signal to the subsequent sensitive rectifier circuit 112.

The sensitive rectifier circuit 112 does not include any local oscillator based on RF frequencies, but it includes, for example, a clock type bias application rectifier circuit to attain low energy consumption, and downconverts the output from the low-noise amplifier 111 to a baseband signal.

The baseband signal amplifier 113 includes, for example, a current-mirror circuit and current/voltage (I-V) conversion circuit, and amplifies the output from the sensitive rectifier circuit 112.

The comparator 114 allows setting of a plurality of thresholds (Th1, Th2, Th3), as shown in, for example, FIG. 3, and is set with, for example, a low threshold Th3 so as to be able to detect all beacons. Note that the gains of the low-noise amplifier 111 and baseband signal amplifier 113 are set to be maximum. The comparator 114 determines the output of the baseband signal amplifier 113 using the set threshold at predetermined periods. That is, when the output of the baseband signal amplifier 113 exceeds the threshold, the comparator 114 outputs a high-level signal (level High); otherwise, it outputs a low-level signal (level 0).

The beacon detection unit 121 uses a beacon transmission period (102.4 ms) of a base station as a search window to detect a reception timing of a signal which is more likely to be a beacon signal from the output of the comparator 114. As functions for this purpose, the beacon detection unit 121 includes a majority determination unit 121a, accumulation processing unit 121b, and threshold determination unit 121c.

More specifically, as shown in FIG. 4, the beacon detection unit 121 uses a search window having a search width of 102.4 ms as one reception profile, and superposes a plurality of reception profiles (a) to (c) on the time axis to add wireless LAN signals received at the same timings. Since such signal processing serves as a time filer, only beacon signals transmitted at the same period as the search window are added since they appear at identical positions, and randomly generated interference waves are relatively suppressed compared to beacon signals, thus obtaining a reception profile (d). Since data signals have burstiness, they are unlikely to exist at the same period as the search window, and are not largely cumulatively added unlike the beacon signals. From the reception profile (d) which is cumulatively added in this way, signals that exceed a threshold Th are detected as beacon signals, and their reception timings are output to the search result comparison unit 122.

Figure 5:
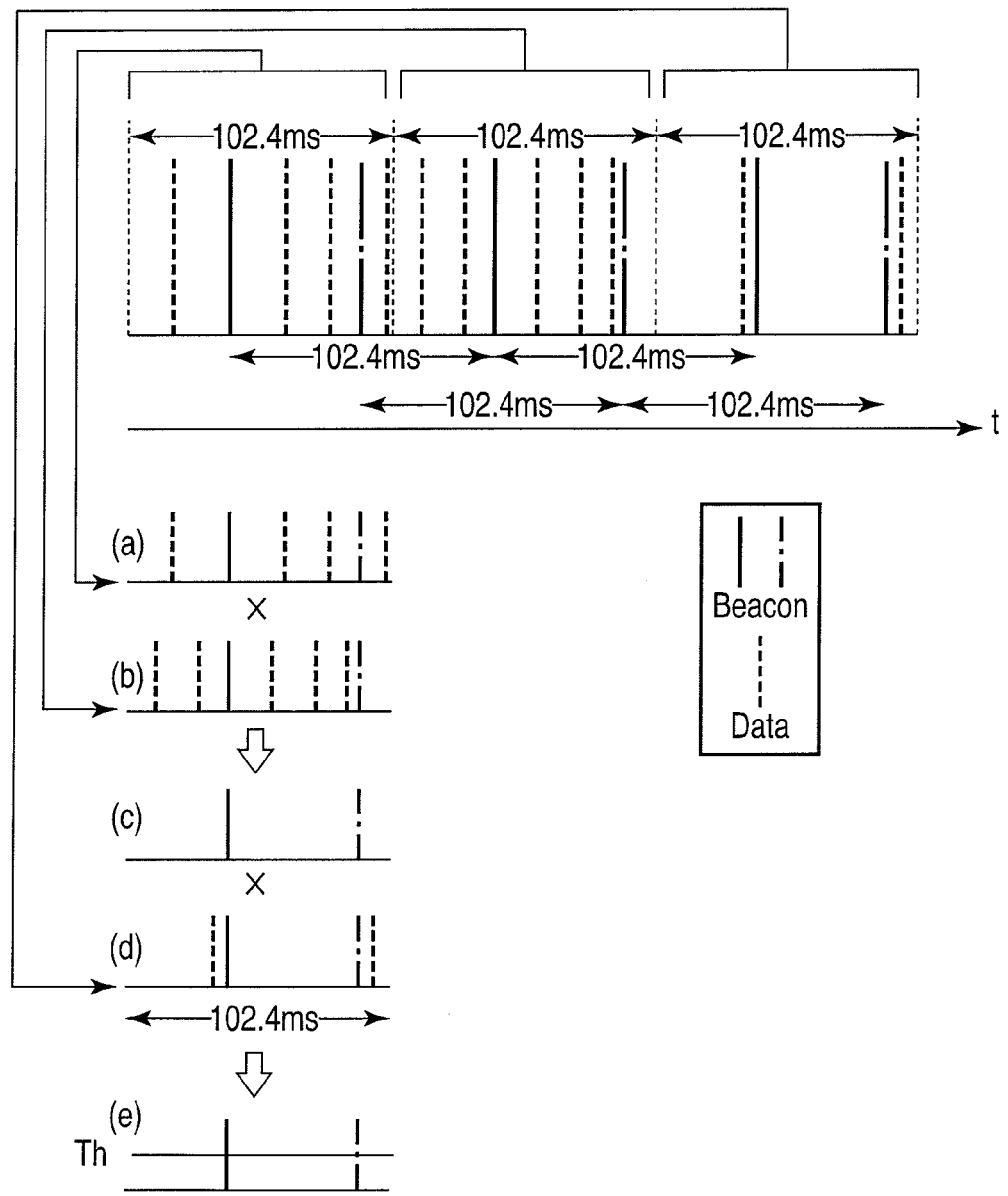
FIG. 5 is a view for explaining detection processing of beacon signals by the low-energy-consumption wireless module shown in FIG. 2.

In addition to the method of emphasizing beacon signals by adding a plurality of reception profiles, as shown in FIG. 4, a method of calculating a correlation between continuous search windows, as shown in FIG. 5 is available. This method calculates a logical product of the outputs of the comparator 114 at identical timings of temporally continuous reception profiles, thereby obtaining signals corresponding to high-level signals which are continuous at identical timings, that is, only signals which are more likely to be beacon signals.

More specifically, logical products of corresponding wireless LAN signals on the time axis are calculated in association with reception profiles (a) and (b), thus obtaining a profile logical product (c). Then, logical products of corresponding wireless LAN signals on the time axis are calculated in association with this profile (c) and a reception profile (d), thus obtaining a profile logical product (e). Wireless LAN signals which appear on this profile logical product (e) and are equal to or higher than the threshold level Th are determined as beacon signals.

Also, the low-energy-consumption wireless module 100 may control the threshold level Th in accordance with the number of samples (number of cumulatively added signals) used in the processing of FIG. 4. Also, the threshold level Th may be decided in consideration of the influence of beacon reception timing deviations. That is, relatively small Th is set in a high-traffic environment in which the reception timings are frequently deviated, and relatively large Th is set in other environments.

The processes shown in FIGS. 4 and 5 will be described in more detail below.

Figure 6:
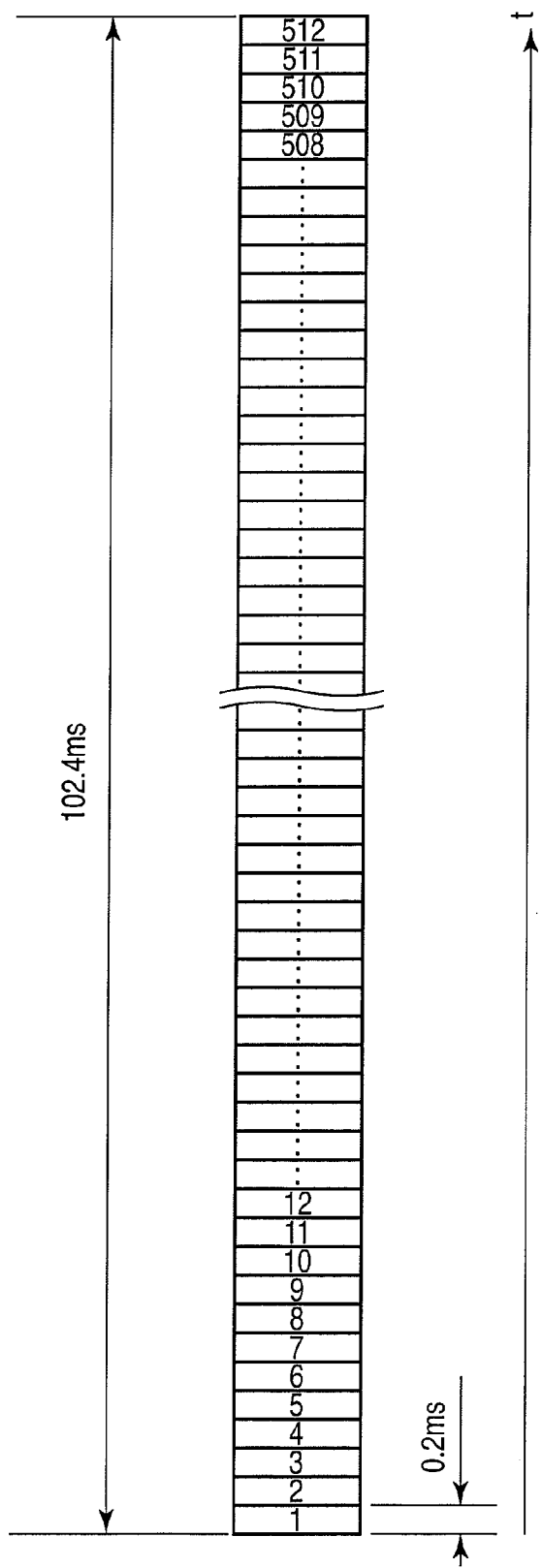
FIG. 6 is a view for explaining processing for a search window shown in FIGS. 4 and 5.

When the search window is defined by 102.4 ms, as described above, and a sampling period is set to be, for example, 200 µs, the search window includes 512 positions, as shown in FIG. 6. In this case, the beacon detection unit 121 has 512 storage areas (referred to as memories hereinafter) corresponding to the respective positions, and sequentially cumulatively adds the output results of the comparator in case of FIG. 4 or sequentially calculates logical products in case of FIG. 5 in association with positions from position 1 to position 512.

In general, a versatile oscillator of 32.768-kHz clocks is commercially available. A case will be examined below wherein this oscillator is used. When the clock frequency is 32.768 kHz, there are a large number of positions, that is, 3355 positions for the search window of 102.4 ms, and a large number of memories are required.

Figure 7:
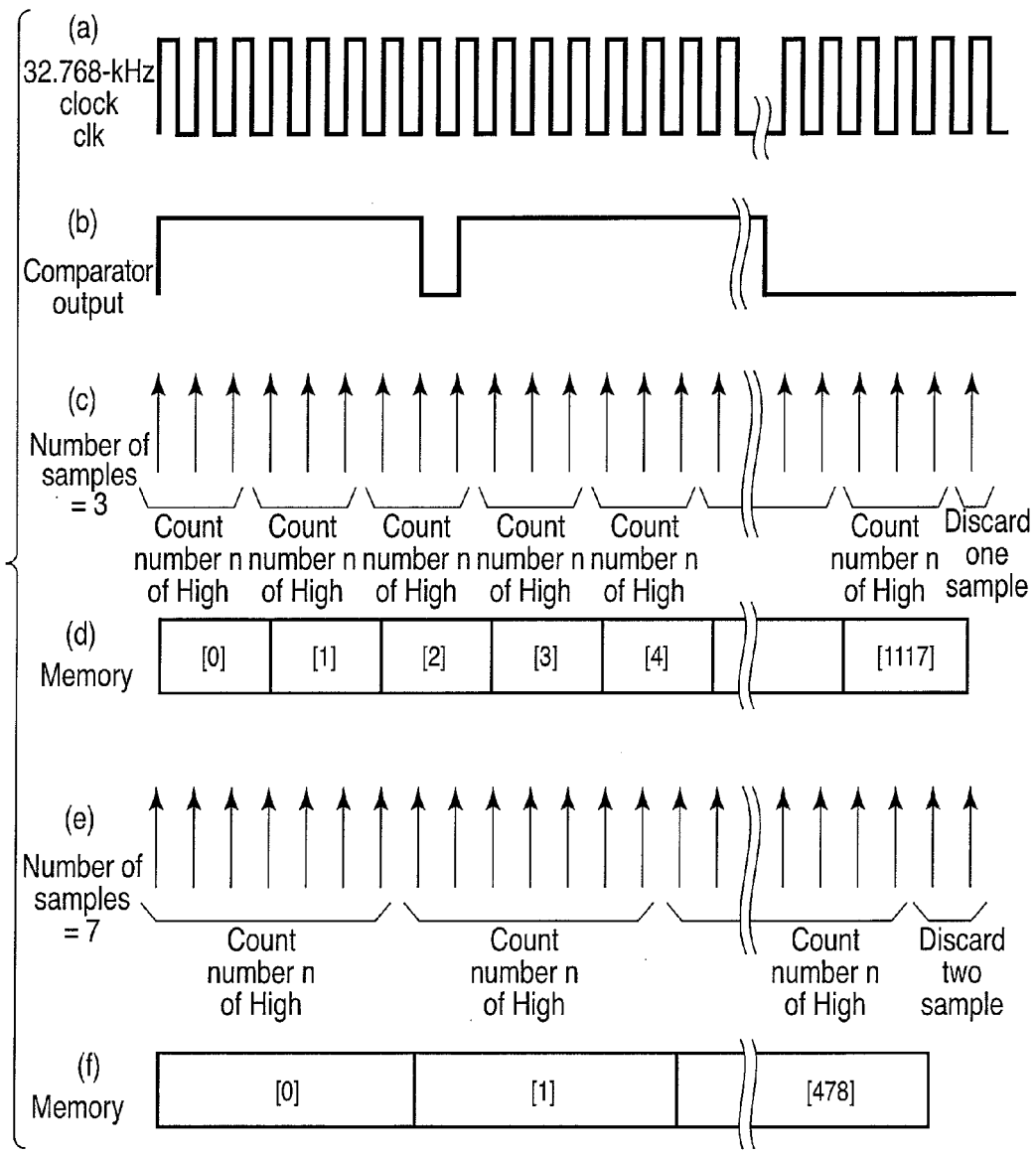
FIG. 7 is a view for explaining majority determination by a majority determination unit shown in FIG. 2.

Hence, the majority determination unit 121a samples the outputs of the comparator 114 at 32.768 kHz, and performs majority determination of every k samples. Then, the majority determination unit 121a outputs one level determination result during a period corresponding to the k samples, and can compress a total of 3355 samples to 1/k, thus reducing the required number of memories to 3355/k. FIG. 7 shows examples of k=3 and k=7.

Figures 8, 9:
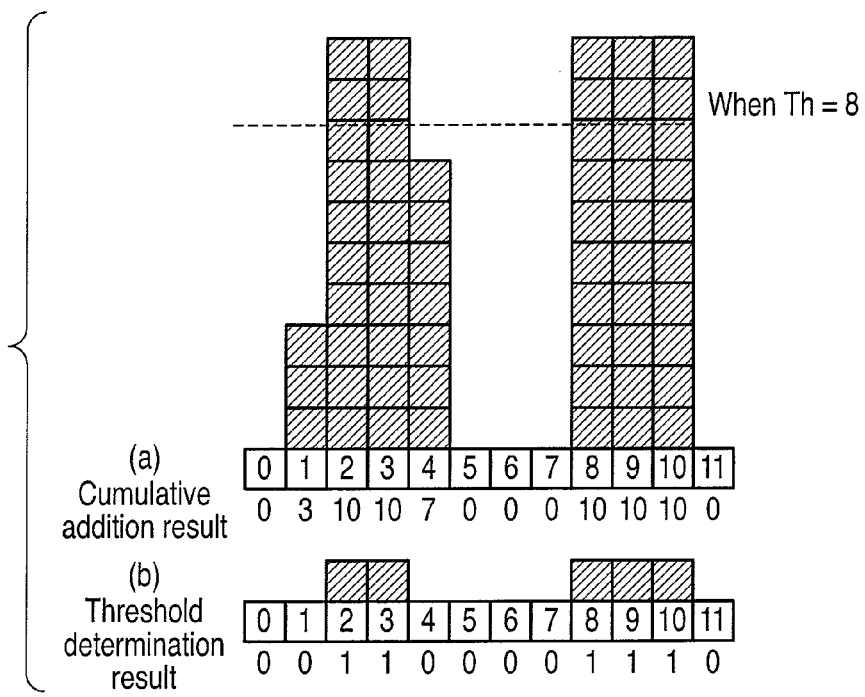
FIG. 8 is a table for explaining majority determination by the majority determination unit shown in FIG. 2.
FIG. 9 is a view for explaining threshold determination by a threshold determination unit shown in FIG. 2.

Comparator outputs (FIG. 7(b)) are sampled using 32.768-kHz clocks (FIG. 7(b)), and the majority determination unit 121a performs majority determination to have k=3, as shown in, for example, FIG. 7(c). Then, the number of required memories is 1118, as shown in FIG. 7(d). When majority determination is performed to have k=7 (FIG. 7(e)), the number of required memories is 479, as shown in FIG. 7(f). FIG. 8 shows k values, the numbers of required memories, storage periods, memory storage errors between the 102.4-ms period and memory sizes to be used, the numbers of (extra) samples to be discarded per search window, and errors after 10 cumulative additions.

Upon completion of majority determination of every k samples for respective samples of one search window, that is, those at all 3355 positions, the majority determination unit 121a repetitively executes the same processing for samples at respective positions of a next search window which follows the processed search window.

Note that the k value may be dynamically changed as needed. For example, when a reception quality (signal-to-noise ratio) is low, the k value is controlled to be larger. Also, the same results as those in FIG. 8 can be obtained by multiplying the sampling frequency (32.768 kHz) by k.

The accumulation processing unit 121b executes accumulation processing of determination results calculated by the majority determination unit 121a in 3355/k memories. That is, in the example shown in FIG. 4, the accumulation processing unit 121b obtains a result (d) from results (a), (b), and (c), and holds it in memories, as described above. On the other hand, in the example shown in FIG. 5, the accumulation processing unit 121b calculates logical products of determination results (a), (b), and (d) calculated by the majority determination unit 121a, and holds (e) in memories.

Note that the accumulation processing (that shown in FIG. 4 or 5) by the accumulation processing unit 121b may be executed after positional deviations due to clock errors are corrected. In order to compensate clock precision, the number of samples to be accumulated may be limited to the predetermined number of times. That is, the memories are cleared every predetermined number of times. Thus, clock errors can be prevented from being accumulated. Furthermore, this accumulation processing may be intermittently executed to suppress energy consumption of the low-energy-consumption wireless module 100.

The threshold determination unit 121c performs threshold determination for the result (FIG. 4(d) or FIG. 5(e)) obtained by the accumulation processing to detect signals accumulated to be equal to or larger than a threshold as beacon signals, thereby detecting the reception timings of the beacon signals. Especially, when the cumulative addition method is adopted, as shown in FIG. 4(d), positions (reception timings) corresponding to memories which hold cumulatively added information equal to or larger than the threshold (FIG. 9(b)) of cumulatively added information (FIG. 9(a)) are detected as timings at which the beacon signals are received, as shown in detail in FIG. 9.

Note that the threshold determination unit 121c determines continuous ones of positions where the accumulation results equal to or larger than the threshold are obtained as one identical beacon signal. That is, the threshold determination unit 121c detects a plurality of continuous positions as the reception timing of one beacon signal.

The search result comparison unit 122 includes a storage unit. The search result comparison unit 122 generates and stores, in this storage unit, a previous search result storage list L1 and current search result storage list L2. The previous search result storage list L1 is a list of reception timings previously detected by the beacon detection unit 121. The current search result storage list L2 is a list of latest reception timings detected by the beacon detection unit 121. Then, the search result comparison unit 122 detects movement into a service area of a new base station based on the previous search result storage list L1 and current search result storage list L2.

Note that the search result comparison unit 122 compares the search results after it compensates memory storage errors shown in FIG. 8 and clock errors. Detailed processing will be described later.

The host instruction unit 123 supplies instructions to the main control unit 500 based on the detection result of the search result comparison unit 122.

The wireless module 200 is a so-called WiFi® module which makes wireless LAN communications with the base station, and its operation is controlled by instructions from the main control unit 500. The wireless module 200 involves higher energy consumption than the low-energy-consumption wireless module 100 since it includes a function of down-converting and decoding a received wireless signal to obtain data, and a function of transmitting data (encoding, modulation, and wireless transmission).

The display unit 300 presents visual information such as characters and images to the user, and is configured using a display device such as a liquid crystal display (LCD).

The input unit 400 is an input interface which uses, for example, a plurality of key switches and a touch panel, and accepts requests from the user.

The main control unit 500 systematically controls the respective units of the mobile wireless terminal, and includes functions of supplying electrical power to the low-energy-consumption wireless module 100 and wireless module 200 and controlling the operations of these modules. Note that the main control unit 500 can supply electrical power to the low-energy-consumption wireless module 100 to operate it even when the main control unit 500 is inactive (in a halt or sleep state). Also, the main control unit 500 can be activated from an inactive state (halt or sleep state) under the control of the low-energy-consumption wireless module 100.

In the aforementioned example, the low-energy-consumption wireless module 100 and wireless module 200 are cooperated via the main control unit 500. Especially, by providing the functions of the main control unit 500 to the low-energy-consumption wireless module 100 or wireless module 200, the low-energy-consumption wireless module 100 and wireless module 200 may be configured to be directly cooperated without the intervention of the main control unit 500.

Figure 10:
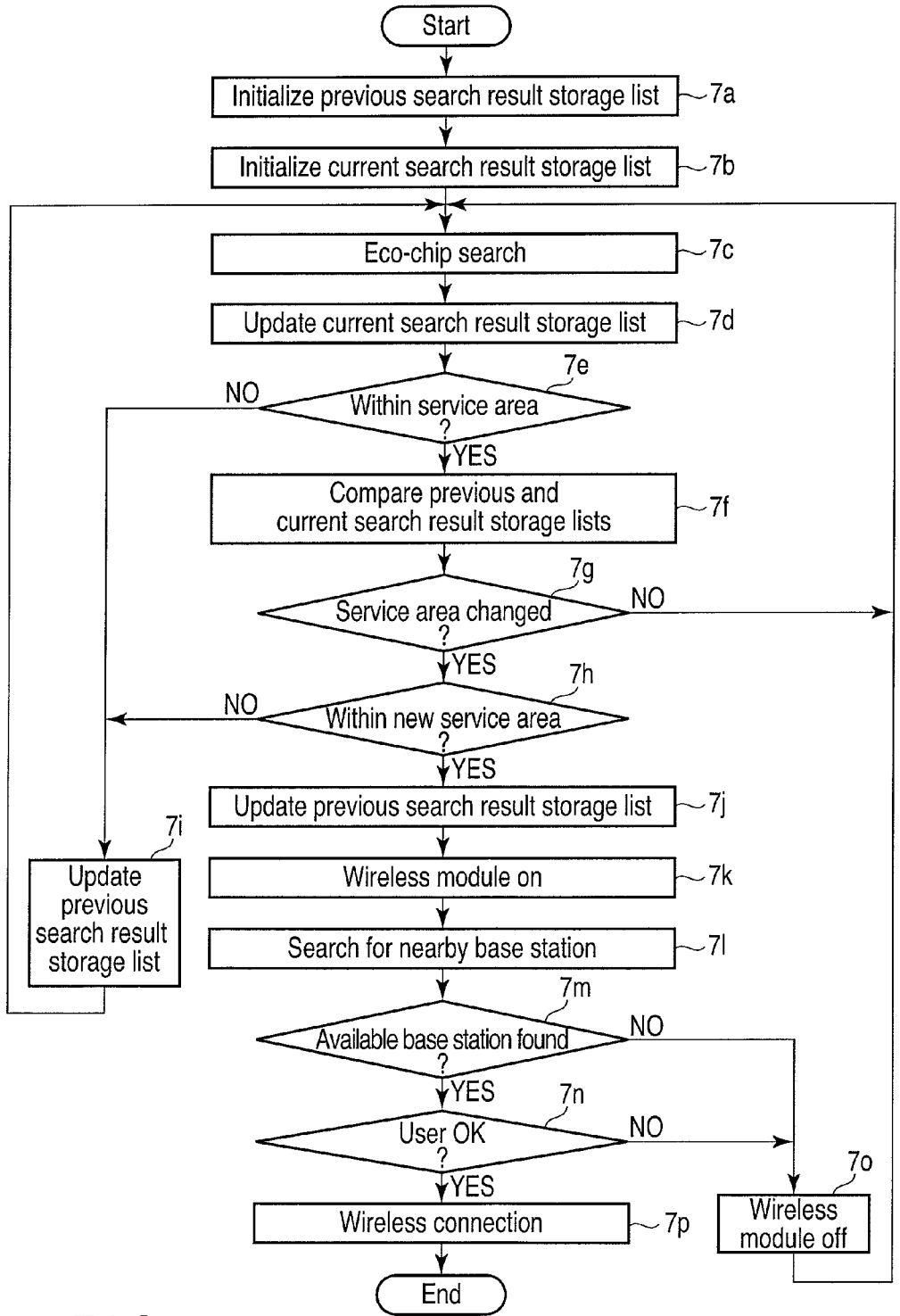
FIG. 10 is a flowchart showing an operation in a standby state of the mobile wireless terminal shown in FIG. 1.

The operation of the mobile wireless terminal with the above arrangement will be described below. In the following description, especially, operations upon searching for a base station and those until a wireless connection is established with the base station will be explained. FIG. 10 is a flowchart for explaining the operations. This flowchart shows the processes to be executed by the low-energy-consumption wireless module 100, wireless module 200, and main control unit 500, and these processes are executed when the low-energy-consumption wireless module 100 accepts an instruction from the main control unit 500. The following description will be given while taking as an example a case in which the sampling frequency for the comparator 114 is 32.768 kHz.

Note that even during the processes shown in FIG. 10, when the user inputs a connection request via the input unit 400, the main control unit 500 controls the wireless module 200 to detect service set identifiers (SSIDs) of connectable base stations, detects an available base station having the best reception condition or a base station designated by the user to establish a wireless connection, and starts communications. For example, the main control unit 500 executes such process in step 7p.

While the low-energy-consumption wireless module 100 executes the processes shown in FIG. 10, the main control unit 500 often shifts to an inactive state (halt or sleep state). For example, when no user operation is made via the input unit 400 and a standby state continues for a predetermined time period or longer, the low-energy-consumption wireless module 100 starts the processes, while the main control unit 500 shifts to an inactive state (halt or sleep state). However, the main control unit 500 may monitor a user's request via the input unit 400, and may restore from the halt or sleep state to a normal operation state in response to the user's request.

In step 7a, the low-energy-consumption wireless module 100 (search result comparison unit 122) initializes the previous search result storage list L1 stored in the storage unit, and the process advances to step 7b.

In step 7b, the low-energy-consumption wireless module 100 (search result comparison unit 122) initializes the current search result storage list L2 stored in the storage unit, and the process advances to step 7c.

In step 7c, the low-energy-consumption wireless module 100 (analog signal processor 110 and beacon detection unit 121) receives wireless LAN signals transmitted from base stations to search for base stations (beacon signals), and the process advances to step 7d.

More specifically, the majority determination unit 121a samples the outputs from the comparator 114 to perform majority determination of every k samples, and performs level determination during that period. As a result, the majority determination unit 121a obtains level determination results for 3355/k positions, and stores them in corresponding memories.

Next, the accumulation processing unit 121b executes the accumulation processing exemplified in FIG. 4 or 5. Then, the accumulation processing results are stored in 3355/k memories.

Subsequently, the threshold determination unit 121c performs threshold determination for the results (FIG. 4(d) or FIG. 5(e)) obtained by the accumulation processing, and detects signals accumulated to be equal to or larger than the threshold as beacon signals, thereby detecting the reception timings of the beacon signals.

Note that the threshold determination unit 121c determines continuous ones of positions where the accumulation results equal to or larger than the threshold are obtained as one identical beacon signal. That is, the threshold determination unit 121c generates a reception profile which determines a plurality of continuous positions as the reception timing of one beacon signal.

In step 7d, the low-energy-consumption wireless module 100 (search result comparison unit 122) updates the current search result storage list L2 by the reception profile (FIG. 4(d) or FIG. 5(e)) calculated in step 7c, and the process advances to step 7e. Then, the current search result storage list L2 stores the reception timings of signals indicated by the reception profile (FIG. 4(d) or FIG. 5(e)). At this time, the number of received beacons may be stored to reduce energy consumption due to circuit scale.

The low-energy-consumption wireless module 100 (search result comparison unit 122) checks in step 7e whether or not the mobile wireless terminal is located within a service area formed by a base station by seeing whether or not signals which are likely to be beacon signals that exceed a pre-set threshold level th are detected with reference to the reception profile (FIG. 4(d) or FIG. 5(e)). If it is determined that the mobile wireless terminal is located within the service area, the process advances to step 7f; if it is determined that the mobile wireless terminal is located outside the service area, the process advances to step 7i.

Figure 11:
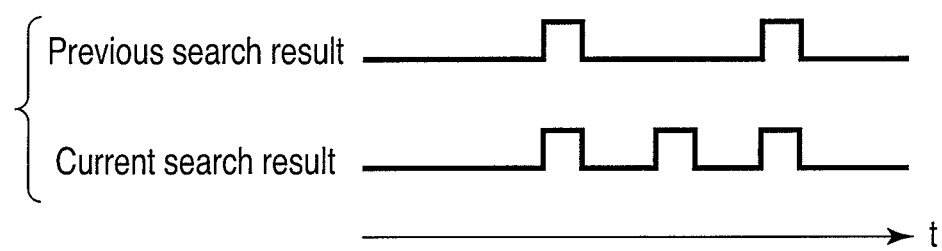
FIG. 11 is a view for explaining the processing in step 7f shown in FIG. 7.

In step 7f, the low-energy-consumption wireless module 100 (search result comparison unit 122) compares the previous search result storage list L1 with the current search result storage list L2, and the process advances to step 7g. That is, the search result comparison unit 122 compares the beacon detection positions, that is, the beacon reception timings in the search window, as shown in, for example, FIGS. 11, in the previous search result storage list L1 and current search result storage list L2. At this time, as described above, the numbers of beacons may be compared in place of the beacon positions (reception timings).

Figure 12:
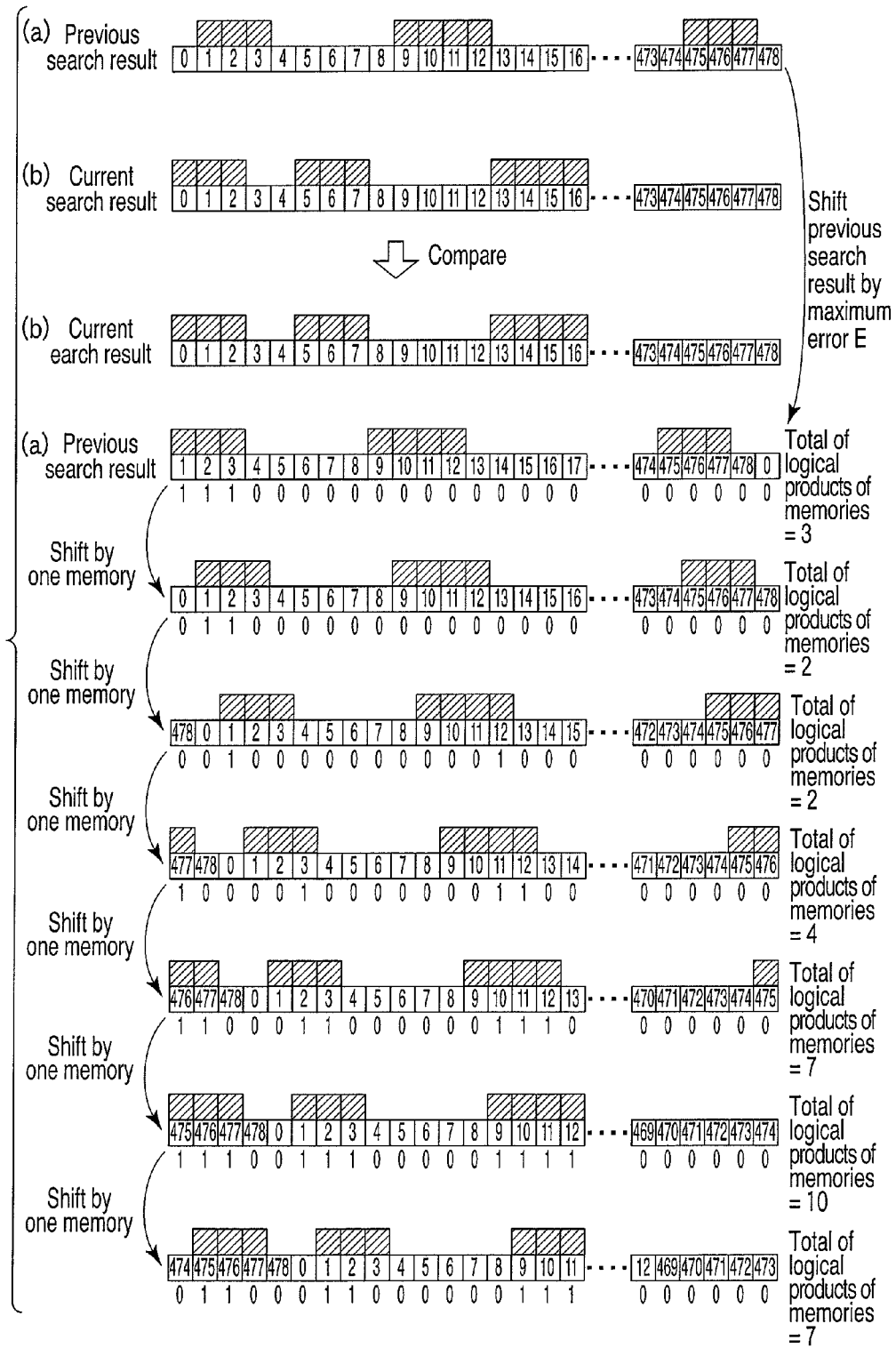
FIG. 12 is a view for explaining compensation for clock errors by a cumulative addition unit shown in FIG. 2.

The comparison processing algorithm of the search result comparison unit 122 will be described in more detail below. The search result comparison unit 122 compensates memory storage errors shown in FIG. 8 and clock errors. The following description will be given with reference to FIG. 12. In order to compensate the memory storage errors and the clock errors, the search result comparison unit 122 executes the following processing.

The search result comparison unit 122 shifts a reception profile based on the previous search result storage list L1 held in the storage unit (referred to as a previous reception profile hereinafter; FIG. 12(a)) to a position where the reception timing is advanced by a maximum error E which is estimated in advance. The search result comparison unit 122 compares the shifted previous reception profile with a reception profile based on the current search result storage list L2 held in the storage unit (referred to as a current reception profile hereinafter; FIG. 12(b)), thus calculating a logical product of these profiles as a correlation value $C_1$. Note that the maximum error E is a value specified by a maximum error which is estimated from frequency errors of 32.768-kHz clocks, and the memory storage errors shown in FIG. 8.

Then, the search result comparison unit 122 repeats, N (=E/T) times, processing for shifting the previous reception profile to a position delayed by a timing T (T=about 30 µs×k) corresponding to one memory, and comparing the shifted previous reception file with the current reception profile to calculate a correlation value $C_n$, thus obtaining correlation values $C_1$ to $C_N$.

The search result comparison unit 122 compares the previous reception profile, from which the maximum correlation value $C_n$ is obtained, with the current reception profile. In this way, the search result comparison unit 122 calculates the correlation values with the current reception profile while cyclically shifting the reception timings of the previous reception profile, and compares the two reception profiles with the maximum correlation value, thereby compensating clock errors.

Detection processing will be described in detail below. The detection processing includes lost beacon signal detection processing P1 for detecting a lost bacon signal, and new beacon signal detection processing P2 for detecting a new beacon signal.

(Lost Beacon Signal Detection Processing P1)

Figure 13:
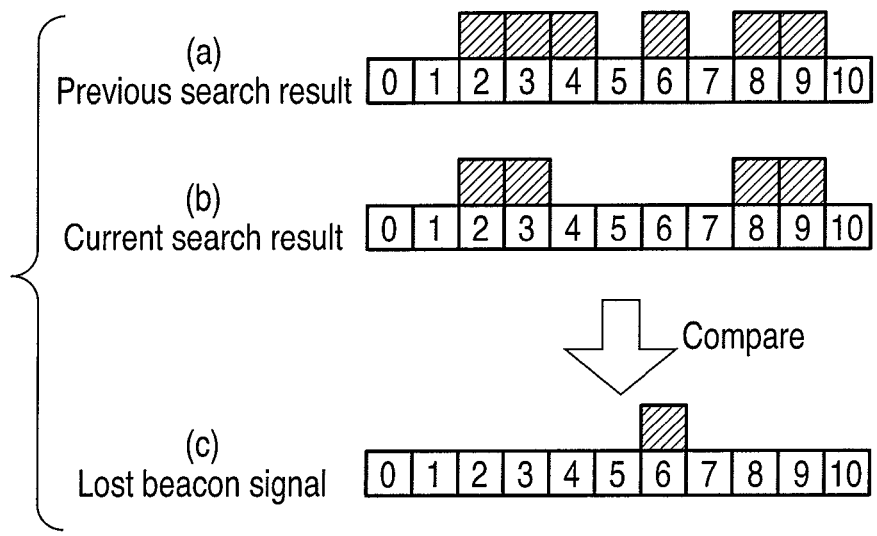
FIG. 13 is a view for explaining determination of a lost beacon signal by a search result comparison unit shown in FIG. 2.

The algorithm of the lost beacon signal detection processing P1 will be described below with reference to FIG. 13. FIG. 13(a) shows the reception timings based on the previous search result storage list L1, and FIG. 13(b) shows those based on the current search result storage list L2.

The search result comparison unit 122 compares these lists to detect that beacon signals were lost at the 4th and 6th positions (FIG. 13(c)). However, the search result comparison unit 122 does not determine that the beacon signal at the 4th position was lost since it neighbors that at the 3rd position and there is a possibility due to fluctuations that the signal was temporarily detected at the timing of (a) or that it was temporarily lost at the timing of (b). On the other hand, the search result comparison unit 122 detects that the beacon signal at the 6th position was lost since there are no neighboring beacons.

The search result comparison unit 122 gives a count value N to the position where the beacon signal was lost (referred to as a lost position hereinafter) to manage that position so as not to determine generation of a new beacon signal during a predetermined time period even when a new beacon signal is generated.

Figure 14:
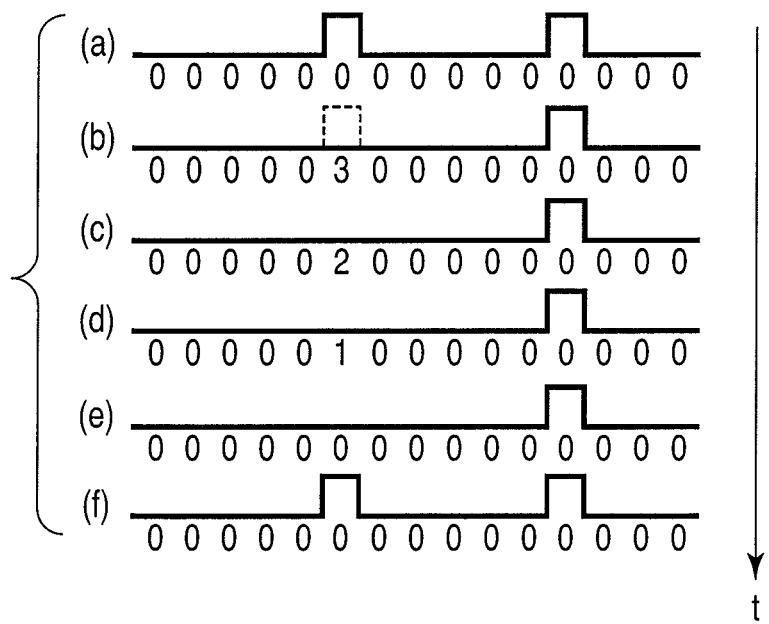
FIG. 14 is a view for explaining management of a lost beacon signal by the search result comparison unit shown in FIG. 2.

More specifically, the search result comparison unit 122 sets the count value N at the lost position in step 7f. FIG. 14 shows transition states (a) to (f) of search results.

In the example shown in FIG. 14, when a reception condition shown in (a) transits to that shown in (b), the search result comparison unit 122 sets the count value N (3 in the example of FIG. 14) at a lost position. Assume that count values "0" are set in advance at other positions.

In step 7f, as for a position where the count value N equal to or larger than 1 is set like in (b) (or (c) or (d)), the search result comparison unit 122 decrements the count value N which is equal to or larger than 1 of the position.

By making such management in step 7f, the count value N is given to a position where a beacon signal was lost (referred to as a lost position hereinafter), and that position is set in a marked state in which the count value equal to or larger than 1 is set after the process in step 7f is executed the predetermined number of times N (until a predetermined time period elapses). That is, once the lost position is set, that position is determined as the lost position during the predetermined time period.

When a new beacon signal is generated before the count value N counts out to zero (before the predetermined time period elapses), the count value N (3 in the example of FIG. 14) may be set again. That is, that position is determined as the lost position during another predetermined time period.

(New Beacon Signal Detection Processing P2)

The algorithm of the new beacon signal detection processing P2 will be described below with reference to FIG. 15. FIG. 15(a) shows the reception timings based on the previous search result storage list L1, and FIG. 15(b) shows those based on the current search result storage list L2.

The search result comparison unit 122 compares these lists, and detects new beacon signals at the 4th and 6th positions (FIG. 15(c)). However, the search result comparison unit 122 does not determine the beacon signal at the 4th position as a new beacon signal since it neighbors a beacon signal at the 3rd position and since there is a possibility due to fluctuations that the signal was temporarily lost at the timing of (a) or it was temporarily detected at the timing of (b). On the other hand, the search result comparison unit 122 detects the beacon signal at the 6th position as a new beacon signal since there are no neighboring beacons.

Then, the search result comparison unit 122 confirms if the count value N equal to or larger than 1 is not set at the position of the new beacon signal unlike in (b), (c), and (d) of FIG. 14 (if the predetermined time period has already elapsed after that position was determined as the lost position). If the count value N equal to or larger than 1 is set, since that position is the lost position, the search result comparison unit 122 determines that an unstable new beacon signal is detected, and cancels detection as a new beacon signal.

On the other hand, when the count value N=0 is set at the position of the new beacon signal, the search result comparison unit 122 determines that the position is not a lost position, and a stable new beacon signal is detected.

The low-energy-consumption wireless module 100 (search result comparison unit 122) checks in step 7g based on the comparison result in step 7f whether or not the service area has changed. More specifically, the low-energy-consumption wireless module 100 checks if a lost beacon signal or a new beacon signal is detected. As described above, the low-energy-consumption wireless module 100 may check whether or not the numbers of beacons match, as described above.

In this case, if a lost beacon signal or a new beacon signal is detected, and it is estimated that the service area has changed, the process advances to step 7h; if it is estimated that service area has not changed (the reception timings or the numbers of beacons match), the process returns to step 7c.

If a new beacon signal is detected (or the number of beacons is increased) as a result of comparison in step 7f, the low-energy-consumption wireless module 100 (the search result comparison unit 122) determines in step 7h that the mobile wireless terminal has moved into a new service area, and the process advances to step 7j. On the other hand, if a new beacon signal is not detected, the low-energy-consumption wireless module 100 determines that the mobile wireless terminal has not moved into a new service area, and the process advances to step 7i.

In step 7i, the low-energy-consumption wireless module 100 (search result comparison unit 122) updates the previous search result storage list L1 by the current search result storage list L2, and the process returns to step 7c. Then, the previous search result storage list L1 stores the reception timings of signals indicated by the reception profile (FIG. 4(d) or FIG. 5(e)) of the current search result storage list L2.

In step 7j, the low-energy-consumption wireless module 100 (search result comparison unit 122) updates the previous search result storage list L1 by the current search result storage list L2, and the process advances to step 7k. Then, the previous search result storage list L1 stores the reception timings of signals indicated by the reception profile (FIG. 4(d) or FIG. 5(e)) of the current search result storage list L2. In this case, the search result comparison unit 122 sends a notification to the host instruction unit 123.

In step 7k, the low-energy-consumption wireless module 100 (host instruction unit 123) notifies the main control unit 500 to activate the wireless module 200, and the process advances to step 7l. As a result, the main control unit 500 stops power supply to the low-energy-consumption wireless module 100 to stop its operation, and starts power supply to the wireless module 200 to activate it.

In this case, when the main control unit 500 is in an inactive state (halt or sleep state), it is activated upon reception of the notification, and stops the low-energy-consumption wireless module 100 (to stop power supply) and activates the wireless module 200 instead in response to the notification. Note that the low-energy-consumption wireless module 100 may be configured to activate the wireless module 200 and to then stop the operation by itself without the intervention of the main control unit 500.

In step 7l, the wireless module 200 receives beacon signals transmitted from respective base stations, and decodes the beacon signals to detect service set identifiers (SSIDs) included in the beacon signals, that is, identification information of the base stations. Then, base stations located around the mobile wireless terminal are detected, and the main control unit 500 is notified of the detection results. The process then advances to step 7m.

The main control unit 500 checks in step 7m based on the SSIDs notified from the wireless module 200 whether or not an available base station (for example, a base station which provides a subscribed service) exists around the mobile wireless terminal. If an available base station exists around the mobile wireless terminal, the process advances to step 7n. On the other hand, if no available base station exists around the mobile wireless terminal, the process advances to step 7o.

In step 7n, the main control unit 500 displays the SSID of the base station, which is determined to be available in step 7m, on the display unit 300, and also displays a message that inquires the user as to whether or not to permit a connection to the base station of this SSID. Then, the main control unit 500 checks if the user inputs an instruction that permits the connection via the input unit 400. If it is detected that the user inputs the instruction that permits the connection, the process advances to step 7p; otherwise, the process advances to step 7o. Alternatively, in this case, a connection may be automatically established based on user's settings.

In step 7o, the main control unit 500 stops power supply to the wireless module 200 to deactivate it, and starts power supply to the low-energy-consumption wireless module 100 to activate it instead. Then, the process returns to step 7c.

If the control reaches step 7o, since it is determined that a base station is not available or the user does not permit the connection to that base station, the main control unit 500 stores the SSID of the base station in step 7o within a time period, which is set in advance. If step 7m is executed again within that time period, the main control unit 500 may determine an unavailable base station based on the stored SSID in step 7m. Also, in order to prevent the wireless module 200 from being activated by the unavailable base station again, the previous search result storage list is updated in step 7j.

Furthermore, the main control unit 500 detects the reception timing of the stored SSID based on the cumulative addition result of the reception profiles obtained by the low-energy-consumption wireless module 100 and the SSID received by the wireless module 200, and notifies the low-energy-consumption wireless module 100 of this reception timing. Then, the low-energy-consumption wireless module 100 may skip a search for timings within a predetermined period including the reception timing notified from the main control unit 500 in next step 7c. In this way, an unwanted search period by the low-energy-consumption wireless module 100 can be suppressed, and still lower energy consumption can be achieved.

In step 7p, the main control unit 500 controls to instruct the wireless module 200 to establish the connection with the available base station. In response to this instruction, the wireless module 200 makes wireless communications with the available base station according to a predetermined protocol to establish a communication link, thus ending the processing.

As described above, in the mobile wireless terminal with the aforementioned arrangement, the low-energy-consumption wireless module 100, which does not include any reception signal decoding function and requires lower energy consumption than the wireless module 200, monitors a reception profile (reception timings) of beacon signals. When the reception timings of the beacon signals have changed, the mobile wireless terminal determines that it has moved into a new service area, and activates the inactivate wireless module 200 to search for a connectable base station. After user confirmation, a connection is established to that base station. If a connection base station is not found (outside a subscribed service area), or if the user refuses a connection, the wireless module 200 is deactivated again.

Therefore, according to the mobile wireless terminal with the aforementioned arrangement, since the low-energy-consumption wireless module 100 that requires lower energy consumption than the wireless module 200 is active, energy consumption required to search for a base station can be reduced, and changes in service area (come home, movement from home, and movement into a hot spot) are successively searched for, thus suppressing the user's convenience from impairing.

For example, in the above embodiments, the beacon transmission period (102.4 ms) is used as a search window, and a search is conducted for the entire search window. However, a search may be conducted for an arbitrary time period in the search window. For example, the comparator 114 and beacon detection unit 121 may skip processing for timings at which beacon signals cannot be received for a pre-set time period or longer, or may execute processing only for timings within a predetermined range including timings at which beacon signals can be received for a pre-set time period or longer, based on the accumulation result of the accumulation processing unit 121b or the determination result of the threshold determination unit 121c. With this control, since a time period required for the reception processing can be shortened, energy consumption can be suppressed.

Note that the range is decided in consideration of a maximum amount of errors caused by cumulative additions. Alternatively, after such search period shortening processing is executed for a predetermined time period, processing for conducting a search for the entire search window may be resumed. By periodically resuming the full search processing, movement to a new service area can be detected even when the user moves.

In the above embodiments, the low-energy-consumption wireless module 100 executes both storage and comparison of the previous search result storage list L1 and current search result storage list L2. However, these processes may be executed by the main control unit 500.

The embodiments have as its object to provide a mobile wireless terminal and a base station search method, which reduce energy consumption upon searching for a base station and suppress user's convenience from impairing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A mobile wireless terminal configured to wirelessly communicate with a base station in a network, the wireless terminal comprising:

a first receiver circuit configured to receive a wireless signal from the base station, to convert the wireless signal to a frequency domain signal, and to detect a beacon signal from the base station based on the frequency domain signal;

a second receiver circuit configured to receive the wireless signal from the base station, to decode the frequency domain signal and to extract identification information of the base station in the frequency domain signal, and to communicate with the base station; and a controller circuit configured to activate the second receiver circuit in accordance with the beacon signal, and to control the second receiver circuit to extract identification information from the base station;

wherein the first receiver circuit is further configured to:

generate a reception profile for detecting signal reception timings within a search window of a predetermined period;

detect a beacon signal from a profile generated based on a plurality of reception profiles;

detect reception timings and reception levels of frequency domain signals within the search window corresponding to the predetermined period;

generate a reception profile which determines a plurality of continuous positions as the reception timing of one beacon signal for detecting a reception timing having a reception level not less than a pre-set threshold; and signals that exceed a threshold are detected as beacon signals with one reception profile generated based on a plurality of reception profiles received at the same timings.

2. The terminal of claim 1, wherein the controller circuit comprises:
a service area detection circuit configured to detect a change in service areas based on a change in reception timing of the detected beacon signal; and
a operation controller circuit configured to activate the second receiver circuit and to control the second receiver circuit to acquire identification information from the base station, when the service area detection circuit detects the change in service areas.

3. The terminal of claim 1, wherein the controller circuit comprises:
a determination circuit configured to determine based on the extracted identification information whether a base station is available; and
a operation controller circuit configured to control the second receiver circuit in order to establish a wireless connection with the base station corresponding to the identification information when the determination circuit determines that the service is available, and to stop an operation of the second receiver circuit when the determination circuit determines that the service is not available.

4. The terminal of claim 1, further comprising:
a display configured to display information; and
a input circuit configured to accept a request from a user, wherein the controller circuit comprises:
a display controller circuit configured to display the extracted identification information on the display; and
a operation controller circuit configured to control second receiver circuit to establish a wireless connection with the base station corresponding to the identification information when the input circuit receives an input indicating a permit of a connection from the user, and to stop an operation of the second receiver circuit when the input circuit receives an input indicating a refusal of a connection from the user.

5. The terminal of claim 1, wherein the first receiver circuit is configured to sample the frequency domain signal using clocks having a pre-set frequency, to determine a level by using a predetermined number of sampling results, and to detect a presence or absence of a beacon signal based on the determined level.

6. The terminal of claim 1, wherein the first receiver circuit is configured to generate" a reception profile for detecting signal reception timings for a partial range of a search window of a predetermined period, and is configured to detect a beacon signal from a profile generated based on a plurality of reception profiles.

7. The terminal of claim 1, wherein the first receiver circuit is configured to generate a reception profile for detecting signal reception timings for a range excluding a portion in a search window corresponding to a predetermined period, and is configured to detect a beacon signal from a profile generated based on a plurality of reception profiles.

8. The terminal of claim 1, wherein the first receiver circuit is configured to detect a beacon signal from a profile obtained by cumulatively adding the plurality of reception profiles for respective reception timings.

9. The terminal of claim 1, wherein the first receiver circuit is configured to detect a beacon signal from a profile obtained by calculating logical products of a plurality of reception profiles for respective reception timings.

10. The terminal of claim 1, wherein the controller circuit is configured to activate the second receiver circuit and to control the second receiver circuit in order to acquire identification information from a base station, when the controller circuit compares a plurality of profiles generated by the first receiver circuit, and detects a difference.

11. The terminal of claim 10, wherein the controller circuit is configured to detect the difference between the plurality of profiles generated by the first receiver circuit after the controller circuit compensates clock errors for the plurality of profiles.

12. The terminal of claim 10, wherein the controller circuit is configured to be in active in detecting the reception timing as the difference, when the controller circuit compares the plurality of profiles generated by the first receiver circuit, and detects a lost reception timing, regardless of detection of a new beacon at the lost reception timing.

13. The terminal of claim 10, wherein the controller circuit is configured to be inactive in detecting the reception timing as the difference, when the controller circuit compares the plurality of profiles generated by the first receiver circuit, and detects a lost reception timing, regardless of detection of a new beacon at the lost reception timing during a predetermined time period since the detection of the lost reception timing.

14. The terminal of claim 13, wherein the controller circuit is configured to be inactive in detecting the reception timing as the difference, when a new beacon is detected at the lost reception timing during a first predetermined time period since detection of the lost reception timing, regardless of detection of a new beacon at the lost reception timing during a second predetermined time period since detection of the new beacon.

15. The terminal of claim 10, wherein the controller circuit is configured to be inactive in detecting the lost reception timing as the difference, when a beacon signal is received at a neighboring timing of the lost reception timing.

16. The terminal of claim 10, wherein the controller circuit is configured to activate the second receiver circuit and to control the second receiver circuit to acquire identification from a base station when the controller, circuit compares a plurality of profiles generated by the first receiver circuit and detects a new reception timing as the difference, and the controller, circuit is configured to be inactive in detecting the new reception timing as the difference, when a beacon signal is received at a neighboring timing of the new reception timing.

17. The terminal of claim 1, wherein the controller circuit is configured to stop an operation of the first receiver circuit during an operation of the second receiver circuit.

18. A base station search method for a mobile wireless terminal configured to wirelessly communicate with a base station in a network, the method comprising:
controlling a first receiver circuit to execute:
receiving a wireless signal from the base station; and
detecting a beacon signal from the base station based on a frequency domain signal obtained from the wireless signal by converting to a frequency domain;
generating a reception profile for detecting signal reception timings within a search window of a predetermined period;
detecting a beacon signal from a profile generated based on a plurality of reception profiles;
detecting reception timings and reception levels of frequency domain signals within the search window corresponding to the predetermined period;

generating a reception profile which determines a plurality of continuous positions as the reception timing of one beacon signal for detecting a reception timing having a reception level not less than a pre-set threshold; and signals that exceed a threshold are detected as beacon signals with one reception profile generated based on a plurality of reception profiles;

activating a second receiver circuit, upon detection of the beacon signal, to execute a wireless communication, the wireless communication comprising;

receiving the wireless signal from the base station; decoding a reception signal obtained from the wireless signal; extracting identification information of the base station; and communicating with the base station.

\* \* \* \* \*